United States Patent
Terada et al.

[11] Patent Number: 5,078,439
[45] Date of Patent: Jan. 7, 1992

[54] BUMPER ASSEMBLY FOR VEHICLES

[75] Inventors: Haruhiko Terada, Obu; Shinichi Haneda, Aichi; Kenji Ono, Toyota; Kiyohito Gyobu, Toyama; Kazunari Azuchi, Himi, all of Japan

[73] Assignees: Aisin Seiki Kabushiki Kaisha; Aisin Keikinzoku Kabushiki Kaisha, Japan

[21] Appl. No.: 583,973

[22] Filed: Sep. 18, 1990

[30] Foreign Application Priority Data

| Sep. 22, 1989 [JP] | Japan | 1-111051 |
| Sep. 22, 1989 [JP] | Japan | 1-111052 |
| Sep. 22, 1989 [JP] | Japan | 1-111053 |
| Sep. 22, 1989 [JP] | Japan | 1-111054 |

[51] Int. Cl.$^5$ .............................................. B60R 19/02
[52] U.S. Cl. ............................... 293/122; 293/121; 293/109
[58] Field of Search ........... 293/102, 109, 120-122; 296/188, 189, 205, 209; 52/731

[56] References Cited

U.S. PATENT DOCUMENTS

| 3,741,560 | 6/1973 | Schaller | 293/121 X |
| 3,933,387 | 1/1976 | Salloum et al. | 293/120 |
| 4,018,466 | 3/1977 | Norlin | 293/122 |
| 4,072,334 | 2/1978 | Seegmiller et al. | 293/122 X |
| 4,582,357 | 4/1986 | Nakamura et al. | 296/209 X |
| 4,762,352 | 8/1988 | Enomoto | 293/122 X |
| 4,826,238 | 5/1989 | Misono et al. | 296/205 X |
| 4,830,416 | 5/1989 | Matsuoka | 293/122 X |
| 4,909,565 | 3/1990 | Harasaki et al. | 296/189 |
| 4,910,938 | 3/1990 | McGee | 52/731 X |
| 4,940,270 | 7/1990 | Yamazaki et al. | 293/122 |

FOREIGN PATENT DOCUMENTS

| 2255277 | 5/1974 | Fed. Rep. of Germany | 293/120 |
| 55031 | 4/1980 | Japan | 293/120 |
| 85759 | 6/1984 | Japan | 293/122 |

Primary Examiner—Margaret A. Focarino
Assistant Examiner—Joseph D. Pape
Attorney, Agent, or Firm—Finnegan, Henderson, Farabow, Garrett & Dunner

[57] ABSTRACT

An automotive vehicle bumper assembly includes a pair of side members constituting part of a vehicle body, a bumper reinforcement supported on the side members and extending transversely of the vehicle body, and an energy absorber arranged on a front surface of the bumper reinforcement. The bumper reinforcement has a rectangular cross section, upper and lower walls, and an intermediate wall connecting the upper and lower walls.

5 Claims, 10 Drawing Sheets

BUMPER ASSEMBLY FOR VEHICLES

BACKGROUND OF THE INVENTION

1. Field of the Invention

This invention relates to a bumper assembly for automotive vehicles and, more particularly, to improvements in a bumper reinforcement and the sectional configuration of the bumper assembly.

2. Description of the Prior Art

Figure 14:
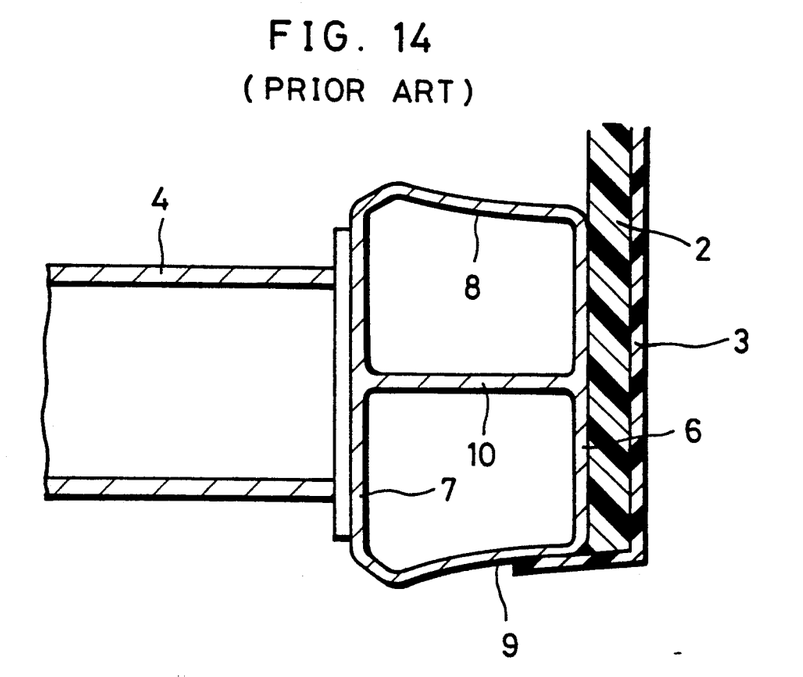
FIGS. 14 through 16 are explanatory views illustrating an example of a vehicle bumper assembly according to the prior art.
Figure 15:
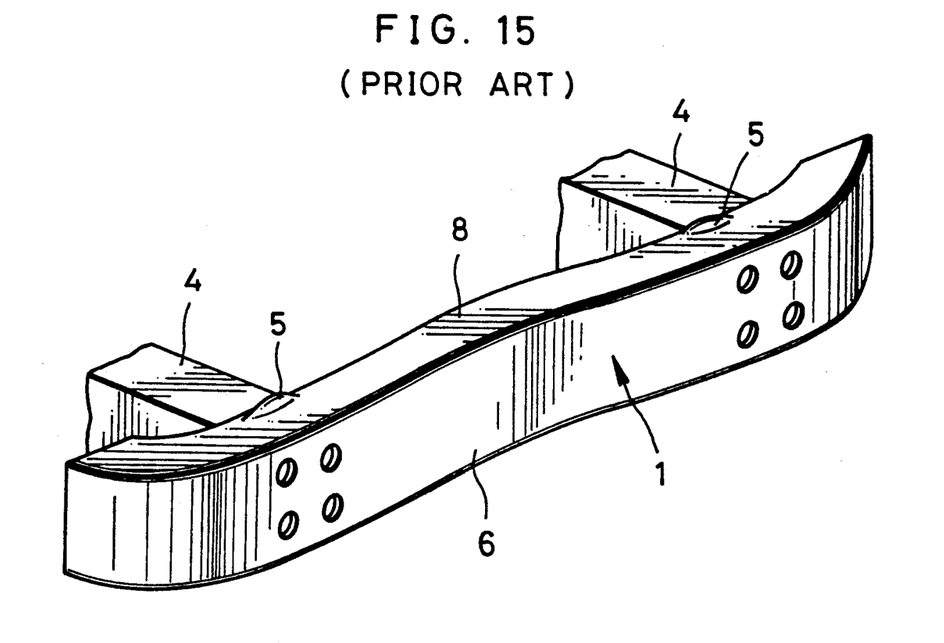
Figure 16:
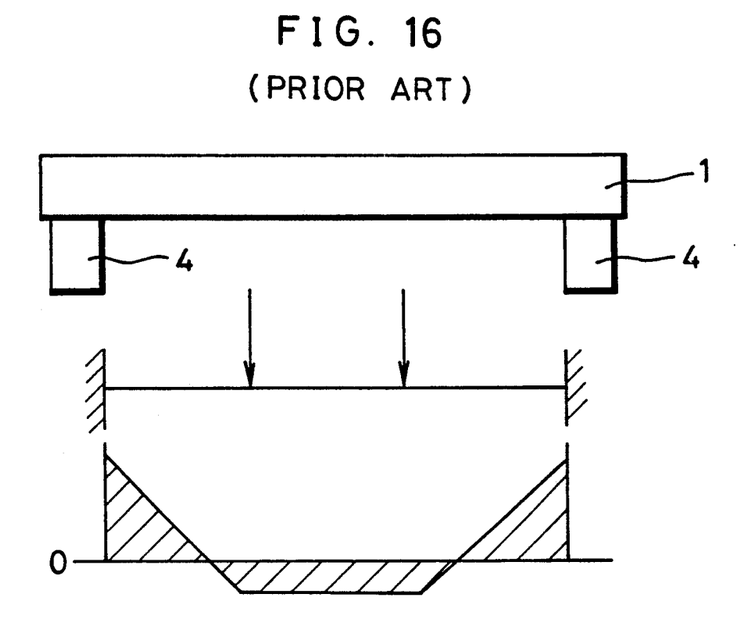

An example of a bumper assembly according to the prior art is as shown in FIGS. 14 through 16. As illustrated in FIG. 14, the bumper assembly includes a bumper reinforcement 1, an energy absorber 2 disposed on the load surface of the bumper reinforcement 1, and a bumper cover 3 covering the energy absorber 2 secured to the bumper reinforcement 1. The bumper assembly is secured, at the back face of the bumper reinforcement 1, to a side member 4 constituting part of the vehicle body. The bumper reinforcement 1 has a box-shaped configuration comprising a front wall 6 on which the load surface is formed, a rear wall 7 on which the back surface is formed, upper and lower walls 8, 9 connecting the front wall 6 and rear wall 7, and a horizontal intermediate wall 10 connecting the front wall 6 and rear wall 7.

A problem with this bumper reinforcement 1 is that when the reinforcement is flexed and deformed by a load such as an impact load, a bending moment in a direction which impedes the flexural deformation is produced at the joint between the bumper reinforcement 1 and side member 4, as shown in FIG. 16, since the reinforcement 1 and side member 4 are in a fixed state. As a result, there is the danger that local deformation will occur in the upper and lower walls 8, 9 near the vicinity where the bumper reinforcement 1 is fixed to the side member 4.

The means for connecting the reinforcement 1 and the side member will now be described.

Figure 17:
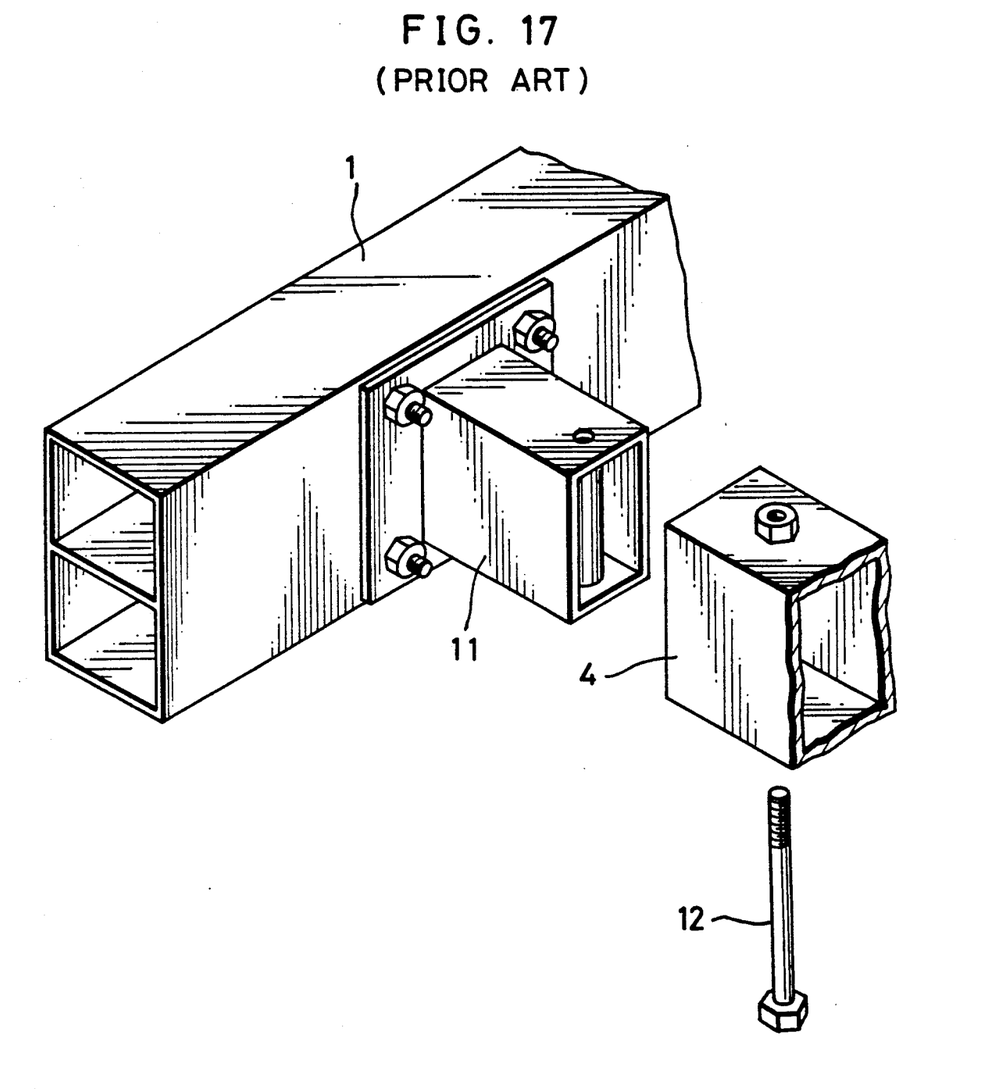
FIGS. 17 through 20 are explanatory views illustrating means for connecting a bumper reinforcement and a side member in a vehicle bumper assembly according to the prior art.

An example of the connecting means according to the prior art is shown in FIG. 17. Specifically, a bumper stay 11 secured to the back surface of the bumper reinforcement 1 is fitted into the side member 4, which constitutes part of the vehicle body, and the bumper stay 11 is fixedly connected to the side member 4 by a bolt 12.

Figure 18:
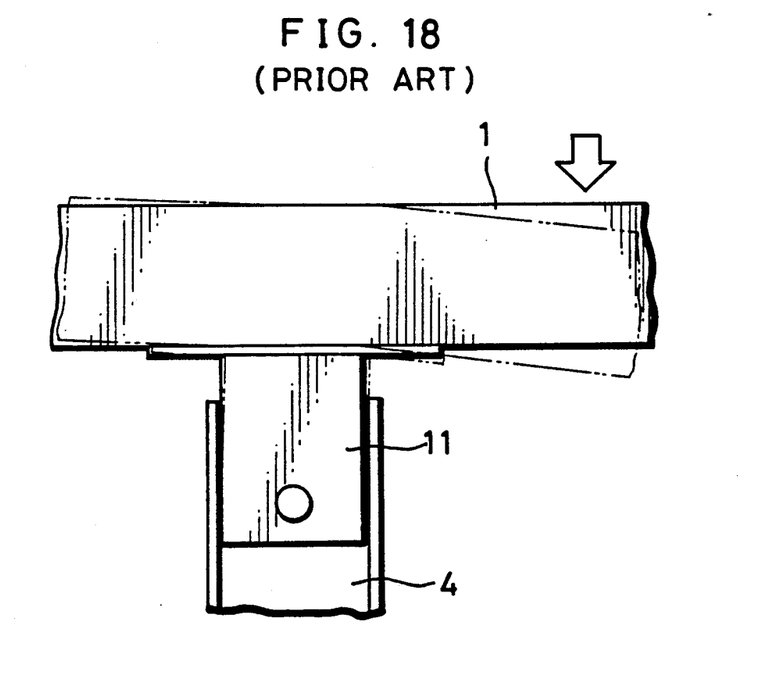
Figure 19:
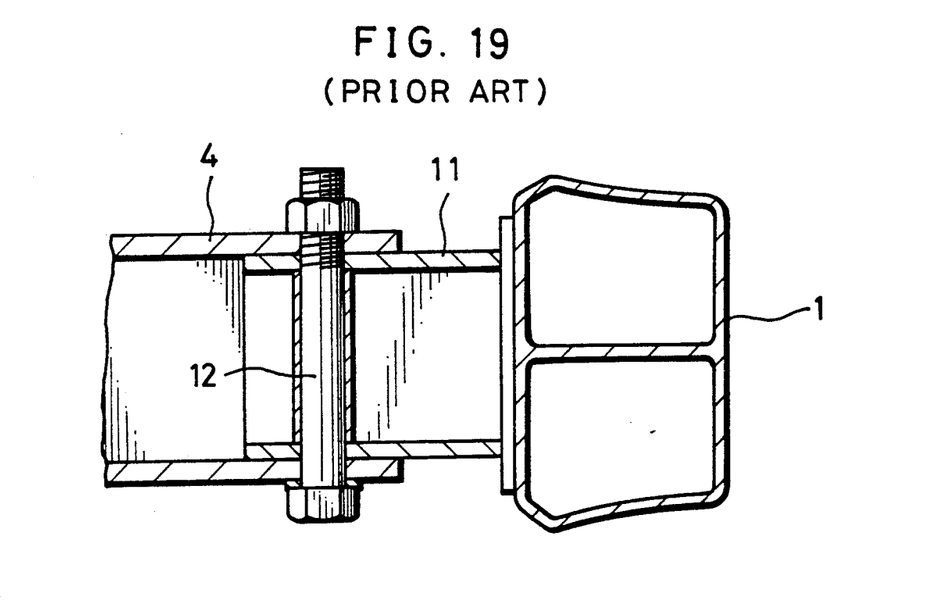
Figure 20:
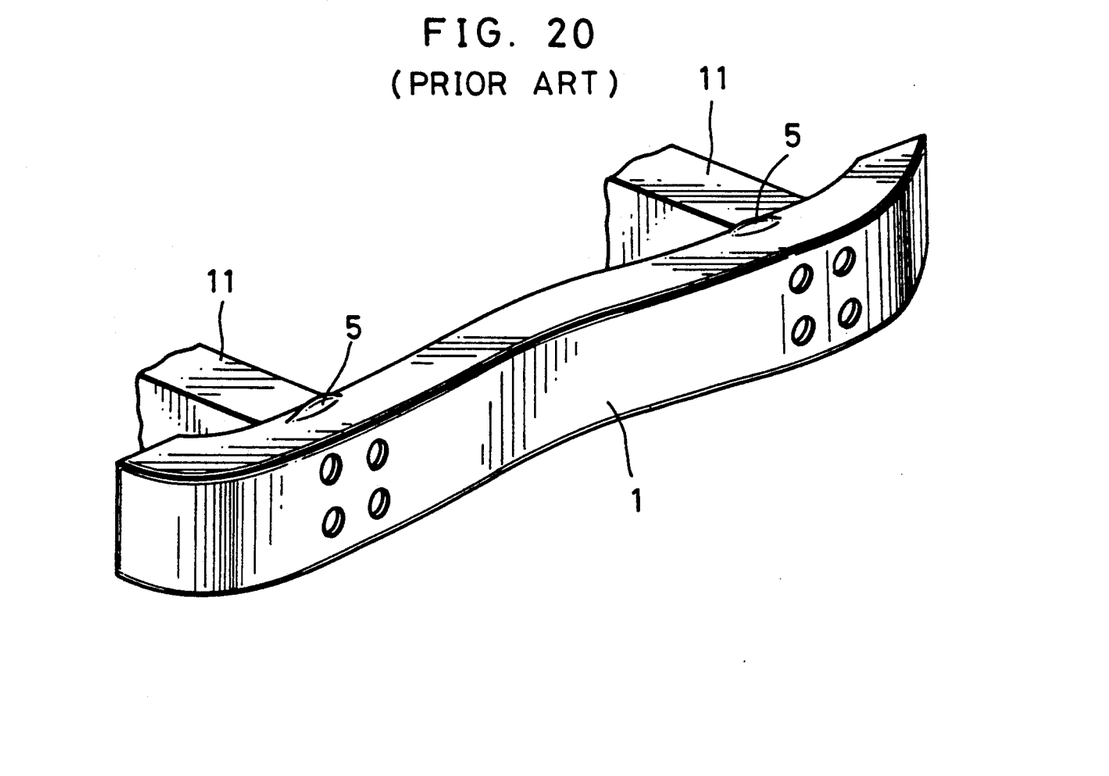

Another problem encountered in this bumper assembly is that when a load is applied in the direction of the arrow due to a collision or the like, as shown in FIG. 18, the bumper reinforcement 1 attempts to undergo flexural deformation, as indicated by the two-dot chain line, owing to the applied load. Since the bumper stay 11 and side member 4 are in a fixed state, a bending moment in a direction which impedes the flexural deformation is produced at the joint between the bumper stay 11 and side member 4. Consequently, there is the danger that local deformation 5 will occur where the bumper reinforcement 1 is fixed to the bumper stay 11, as illustrated in FIGS. 19 and 20.

SUMMARY OF THE INVENTION

Accordingly, an object of the present invention is to provide a bumper assembly in which local deformation of the upper and lower walls of the bumper reinforcement is eliminated.

Another object of the present invention is to provide a bumper assembly adapted to reduce the bending moment produced in the direction which impedes flexural deformation of the bumper reinforcement.

According to the present invention, the foregoing objects are attained by providing a vehicle bumper assembly comprising a pair of side members constituting part of a vehicle body, a bumper reinforcement supported on the side members and extending transversely of the vehicle body, and an energy absorber arranged on a front surface of the bumper reinforcement, the bumper reinforcement having a rectangular cross section, upper and lower walls, and an intermediate wall connecting the upper and lower walls.

With the bumper assembly of the present invention, the buckling strength of the upper and lower walls can be increased, thereby making it possible to eliminate local deformation produced, at portions where the upper and lower walls are fixed to the vehicle body, by a bending moment which develops at the joints between the bumper reinforcement and the vehicle body owing to flexural deformation of the bumper reinforcement caused by impact or the like. In addition, the buckling strength of the upper and lower walls can be increased merely by providing the intermediate wall. As a result, the buckling strength of the upper and lower walls can be raised while maintaining the conventional rigidity of the bumper reinforcement without requiring an increase in the thickness of the upper and lower walls.

Further, the present invention provides a vehicle bumper assembly comprising a bumper reinforcement extending transversely of a vehicle body, an energy absorber arranged on a load surface of the bumper reinforcement, a bumper cover secured to the bumper reinforcement for covering the energy absorber, and a bumper stay secured to a back surface of the bumper reinforcement for connecting the bumper reinforcement to the vehicle body, the bumper stay having a columnar portion extending vertically of the bumper reinforcement, and the vehicle body having insertion holes matching the columnar portion and a connecting member passed through the columnar portion and the insertion holes for turnably connecting the bumper stay to the vehicle body.

The bumper assembly according to this aspect of the invention is capable of reducing the bending moment that hinders flexural deformation of the bumper reinforcement produced at the joints between the bumper stay and the vehicle body, thus making it possible to prevent local deformation at portions where the bumper reinforcement is secured to the vehicle body. Since the flexural deformation of the bumper reinforcement can be increased, the energy absorbing capability of the bumper reinforcement is enhanced, thereby reducing the effects of a collision upon the vehicle body.

The present invention further provides a vehicle bumper assembly comprising a bumper reinforcement extending transversely of a vehicle body, an energy absorber arranged on a load surface of the bumper reinforcement, a bumper cover secured to the bumper reinforcement for covering the energy absorber, the bumper reinforcement having a columnar bumper stay inserted into a through-hole disposed in upper and lower walls in the vicinity of a neutral axis of the bumper reinforcement, and the vehicle body having insertion holes matching a hollow portion of the columnar bumper stay, and a connecting member passed through the hollow portion and the insertion holes for turnably connecting the bumper stay to the vehicle body.

In the bumper assembly according to this aspect of the invention, a compressive load that impedes flexural deformation of the bumper reinforcement can be reduced. As a result, compressive stress can be reduced at the portions where the bumper reinforcement and bumper stay are fixed and near the center of the load surface of the bumper reinforcement. This makes it possible to prevent local deformation. Since the bumper stay is turnably connected to the vehicle body, flexural deformation of the bumper reinforcement is facilitated by this turning motion, and the bending moment that impedes flexural deformation of the bumper reinforcement also can be reduced. Accordingly, local deformation, which is caused by the bending moment, at the portions where the bumper reinforcement is secured to the bumper stay can be prevented. Furthermore, since the flexural deformation of the bumper reinforcement can be increased, the energy absorbing capability of the bumper reinforcement is enhanced, thereby reducing the effects of a collision upon the vehicle body.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described in detail with reference to the drawings.

Figure 1:
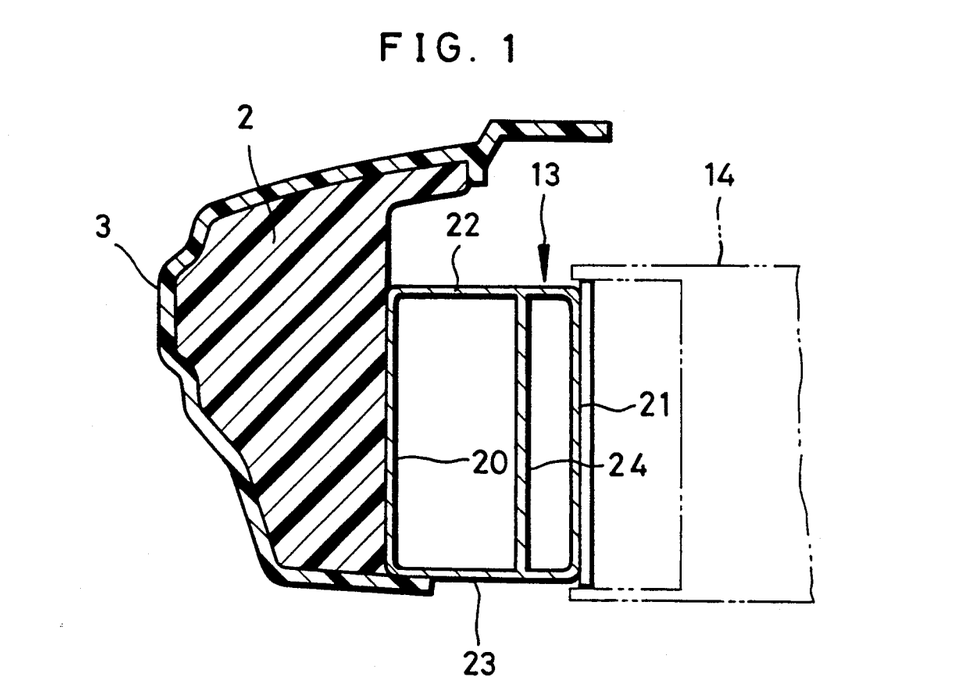
FIG. 1 is a sectional view illustrating an embodiment of a vehicle bumper assembly according to the present invention.
Figure 2:
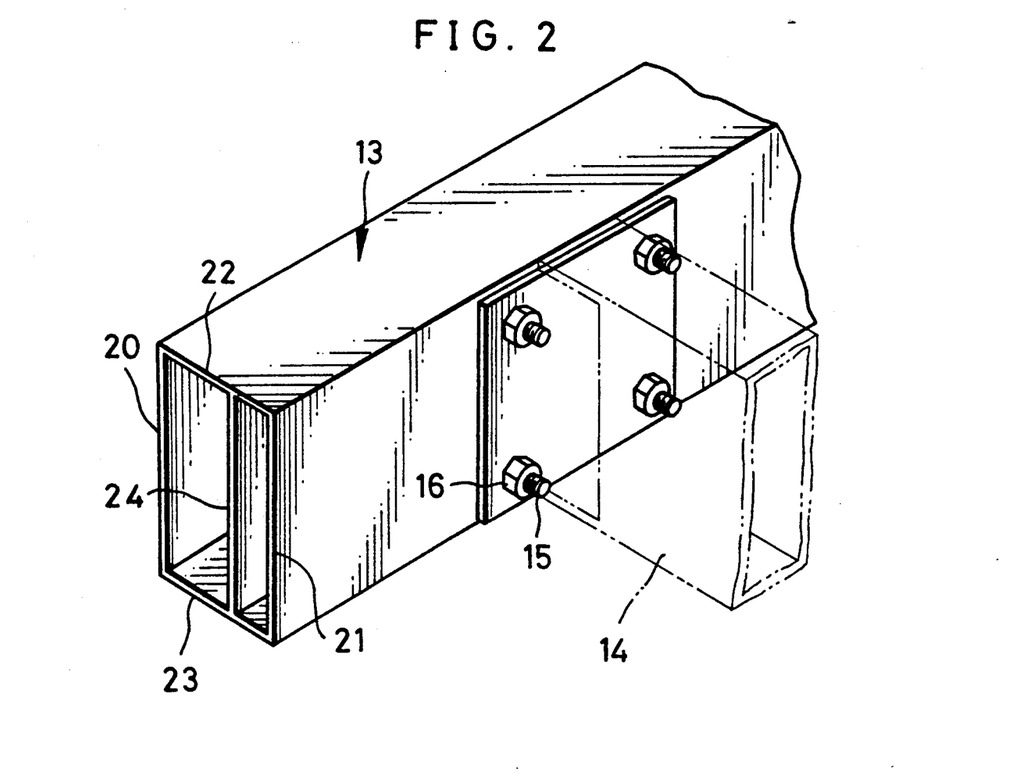
FIG. 2 is an exploded perspective view showing a connecting portion of the bumper assembly.

As shown in FIGS. 1 and 2, an energy absorber 2 is arranged on a load surface of a bumper reinforcement 13, and the absorber 2 is covered by a bumper cover 3 secured to the bumper reinforcement 13. The back surface of the bumper reinforcement 13 is fixedly fastened by a bolt 15 and nut 16 to a side member 14, which constitutes part of a vehicle body (not shown).

Figure 3:
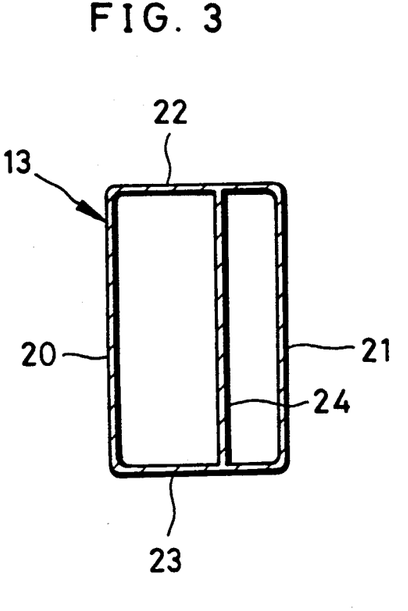
FIG. 3 is a sectional view illustrating a bumper reinforcement.

As illustrated in FIG. 3, the bumper reinforcement 13 has a box-shaped configuration comprising a front wall 20 on which the load surface is formed, a rear wall 21 on which the back surface is formed, and upper and lower walls 22, 23 connecting the front wall 20 and rear wall 21. The bumper reinforcement 13 is provided with an intermediate wall 24, which connects the upper wall 22 and lower wall 23. The intermediate wall 24 is located between the front and rear walls 20, 21 but is closer to the rear wall 21. Owing to this construction, the buckling strength of the upper wall 22 and lower wall 23 is raised. Therefore, even if a bending moment is produced at the connection between the bumper reinforcement 12 and the side member 14 due to flexural deformation of the bumper reinforcement 13 caused by an impact such as a collision, local deformation will not occur at the portion where the upper and lower lowers 22, 23 are fixed to the side member 14. Since the buckling strength of the upper and lower walls 22, 23 can be increased merely by providing the intermediate wall 24, the buckling strength of the upper and lower walls 22, 23 can be raised while maintaining the conventional rigidity of the bumper reinforcement 13 without requiring an increase in the thickness of the upper and lower walls 22, 23.

Figure 4:
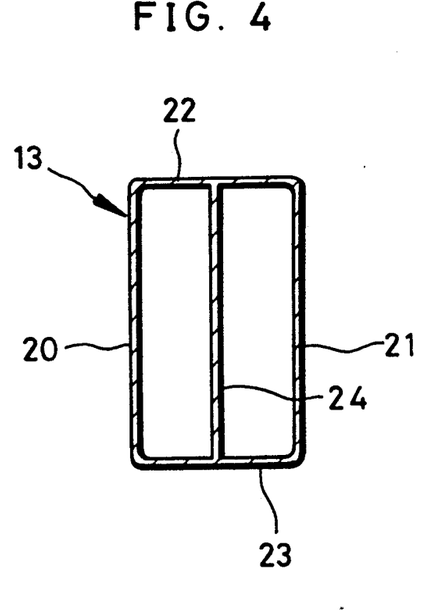
FIG. 4 is a sectional view corresponding to FIG. 3 and showing a second embodiment of the invention.

It should be noted that the intermediate wall 24 can be provided substantially midway between the front and rear walls 20, 21, as depicted in FIG. 4.

Figure 5:
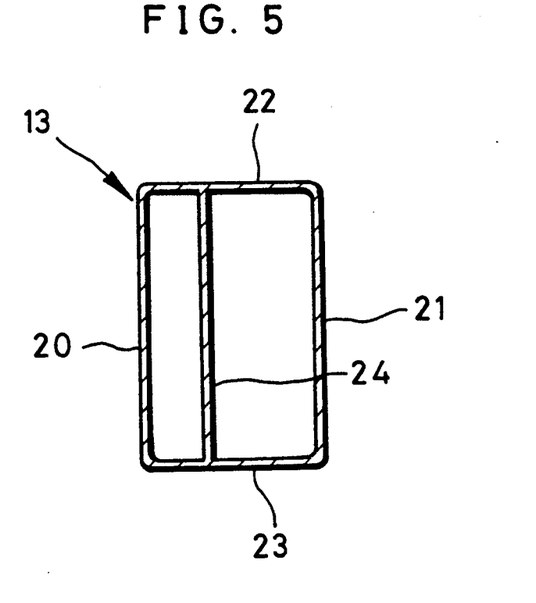
FIG. 5 is a sectional view corresponding to FIG. 3 and showing a third embodiment of the invention.

In an embodiment shown in FIG. 5, the bumper reinforcement 12 has a box-shaped configuration comprising the front wall 20 on which the load surface is formed, the rear wall 21 on which the back surface is formed, and the upper and lower walls 22, 23 connecting the front wall 20 and rear wall 21. The bumper reinforcement 13 is provided with the intermediate wall 24, which connects the upper wall 22 and lower wall 23. Here the intermediate wall 24 is located between the front and rear walls 20, 21 but is closer to the front wall 20. Owing to this construction, the buckling strength of the upper wall 22 and lower wall 23 is raised. This makes it possible to prevent local deformation of the upper and lower walls 22, 23 near the central portion of the bumper reinforcement 13 caused by compressive stress that increases due to concentration of load in the bumper reinforcement 13. In addition, since the neutral axis of the load of bumper reinforcement 13 is shifted toward the side of the front wall 20 by the intermediate wall 24, compressive stress itself is capable of being reduced.

Figures 6, 7:
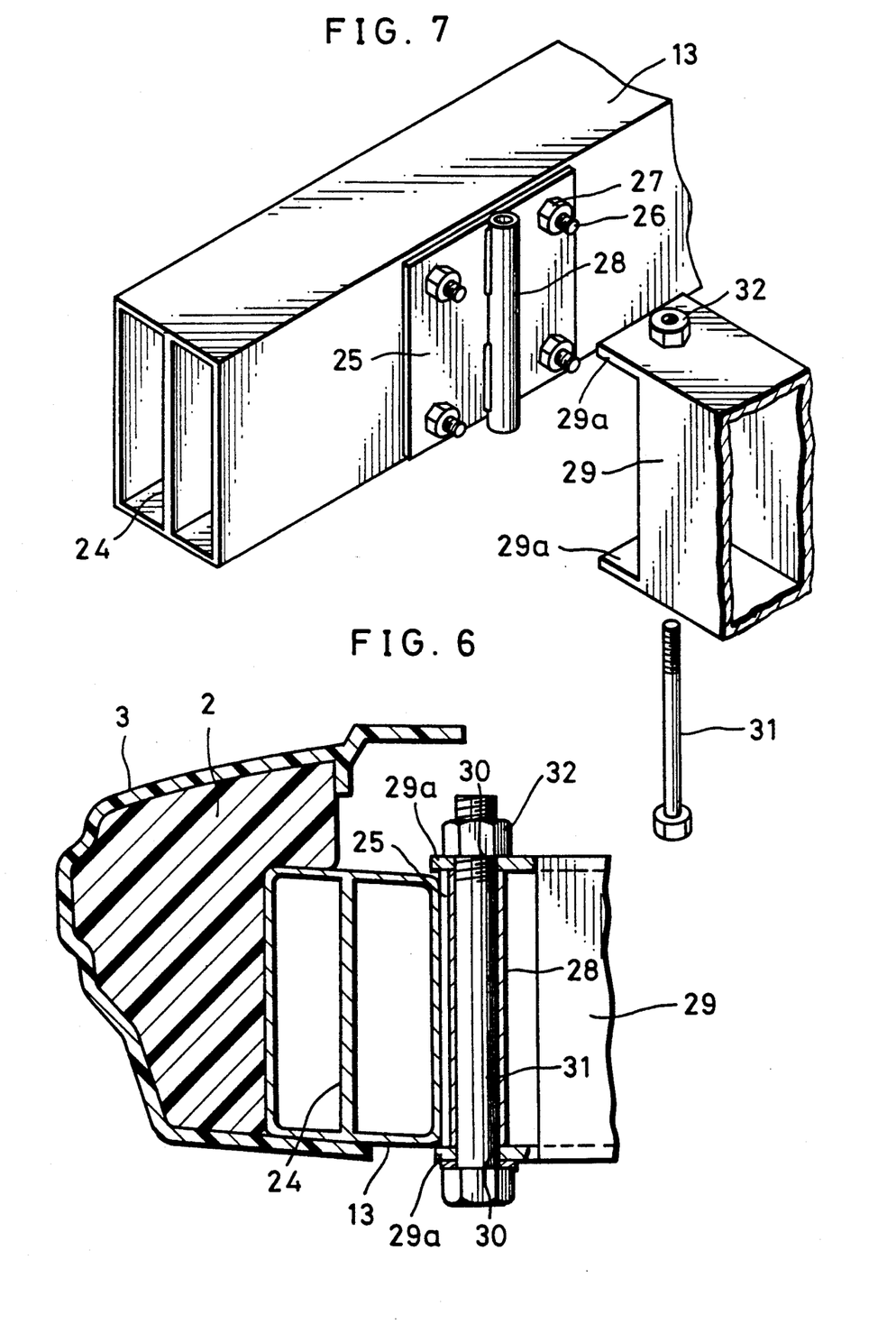
FIG. 6 is a sectional view illustrating means for connecting a bumper reinforcement and a side member in a fourth embodiment of a vehicle bumper assembly according to the present invention.
FIG. 7 is an exploded perspective view of the principal components of FIG. 6.

As shown in FIGS. 6 and 7 illustrating another embodiment of the present invention, the energy absorber 2 is arranged on the load surface of the bumper reinforcement 13, and the absorber 2 is covered by the bumper cover 3 secured to the bumper reinforcement 13. A bumper stay 25 is fastened to the back surface of the bumper reinforcement 13 by a bolt 26 and nut 27. A columnar portion 28 is joined as by welding to the bumper stay 25 and extends vertically of the bumper reinforcement 13 (vertically in FIGS. 6 and 7). The upper and lower sides of a side member 29 constituting part of the vehicle body are formed to include respective flanges 29a that embrace the columnar portion 28 from its upper and lower ends. The flanges 29a are formed to have respective insertion holes 30 that match the columnar portion 28. A bolt 31 is passed through the columnar portion 28 and insertion holes 30 and is tightened by a nut 32, thereby connecting the bumper stay 25 and the side member 29. The bumper stay 25 is capable of turning, relative to the side member 29, about the bolt 31.

It should be noted that the shape of the bumper reinforcement 13 is not limited to that of the present embodiment. Also, the means for fixing the bumper reinforcement 13 to the bumper stay 25 is not limited to that of the present embodiment.

Figure 8:
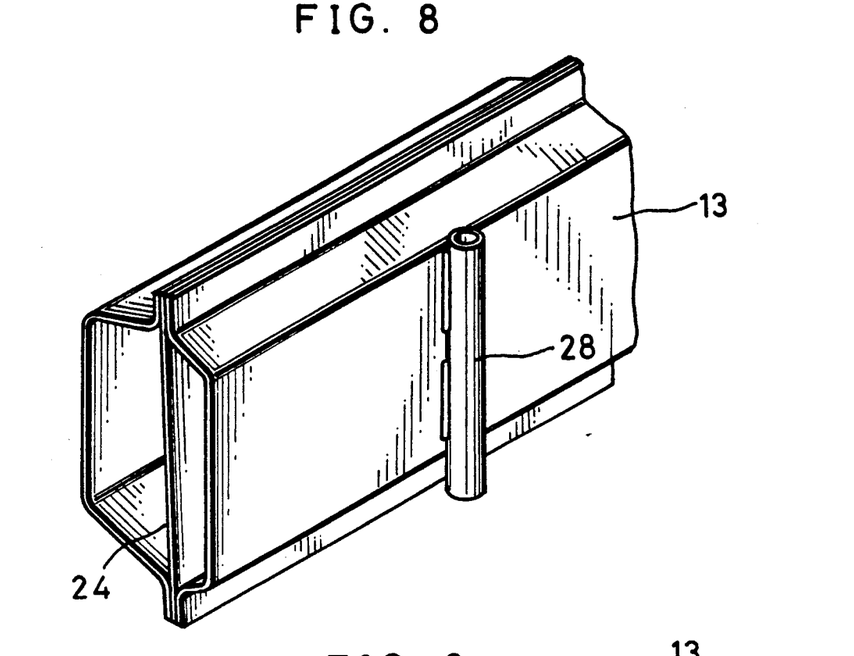
FIGS. 8 and 9 are perspective views illustrating fifth and sixth embodiments of the invention.
Figure 9:
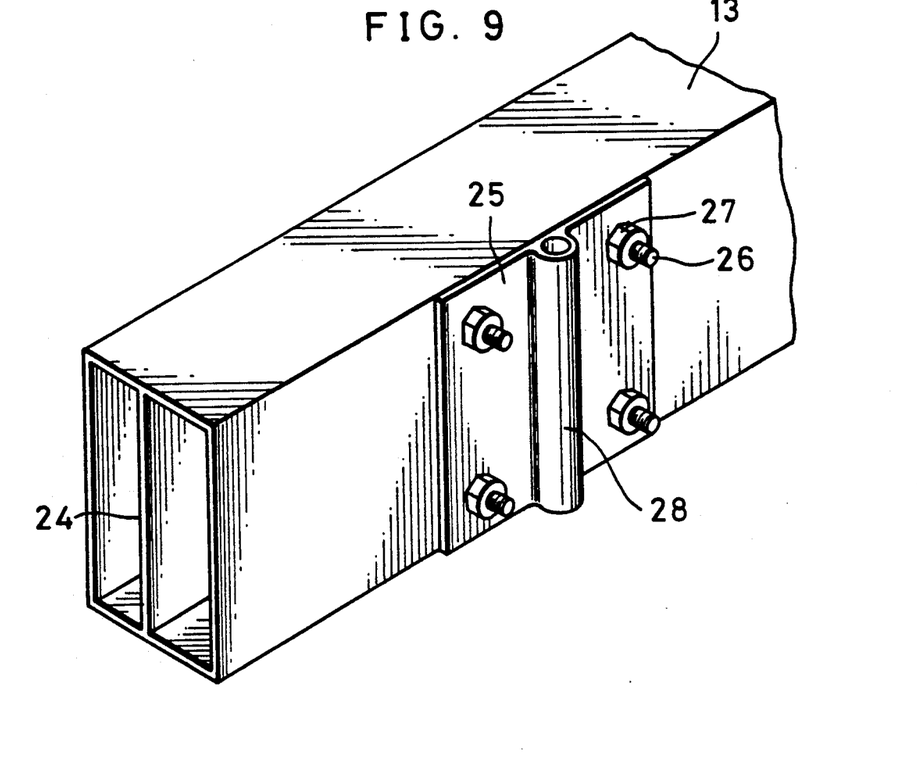

As shown in FIG. 8, the columnar portion 28 can be joined to the bumper reinforcement 13 by being welded directly thereto. Alternatively, the columnar portion 28 can be integrated with the bumper stay 25 as by the extrusion molding of aluminum.

It goes without saying that the bumper reinforcement 13 can be assembled as by welding plates, as shown in FIG. 8.

As described above, the bumper stay 25 is turnably connected to the side member 29 by the bolt 31. Therefore, even if the bumper stay 25 attempts to undergo flexural deformation owing to application of a load to the bumper reinforcement 13 by an impact such as a collision, turning of the bumper stay 25 releases this flexural deformation. Consequently, a bending moment that produces flexural deformation of the bumper reinforcement caused at the joints between the bumper stay 25 and the side member 29 can be reduced, thus making it possible to prevent local deformation at portions where the bumper reinforcement 13 is secured to the bumper stay 25. Since the flexural deformation of the bumper reinforcement can be increased, the energy absorbing capability of the bumper reinforcement 13 is enhanced, thereby reducing the effects of a collision upon the vehicle body.

Figures 10, 11:
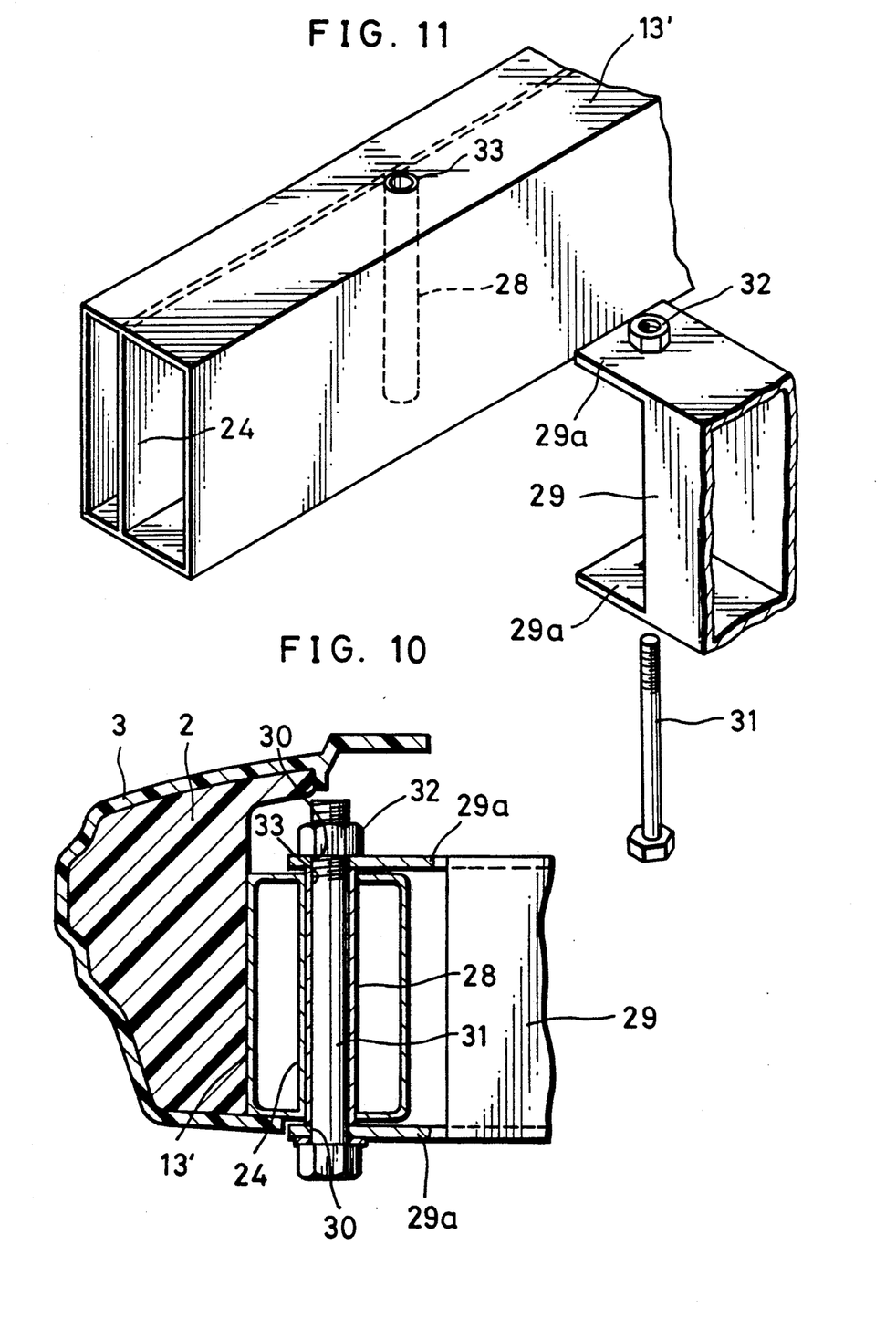
FIG. 10 is a sectional view illustrating a seventh embodiment of a vehicle bumper assembly according to the present invention.
FIG. 11 is an exploded perspective view of the principal components of FIG. 10.

As shown in FIGS. 10 and 11 illustrating another embodiment of the present invention, the energy absorber 2 is arranged on the load surface of a bumper reinforcement 13', and the absorber 2 is covered by the bumper cover 3 secured to the bumper reinforcement 13'.

The bumper reinforcement 13' is formed to have a through-hole 33 in the vicinity of its neutral axis. A bumper stay 28 is arranged inside the through-hole 33. The bumper stay 28, which is columnar in shape, extends vertically of the bumper reinforcement 13' (vertically in FIGS. 10 and 11) and is formed to have a through-hole. The upper and lower sides of the side member 29 constituting part of the vehicle body are formed to include the respective flanges 29a that embrace the bumper stay 28. The flanges 29a are formed to have the respective insertion holes 30 that match the through-hole of the columnar portion 28. The bolt 31 is passed through this through-hole and the insertion holes 30 and is tightened by a nut 32, thereby connecting the bumper stay 28 and the side member 29. The bumper stay 28 is capable of turning, relative to the side member 29, about the bolt 31.

It should be noted that the shape of the bumper reinforcement 13' is not limited to that of the present embodiment.

Figure 12:
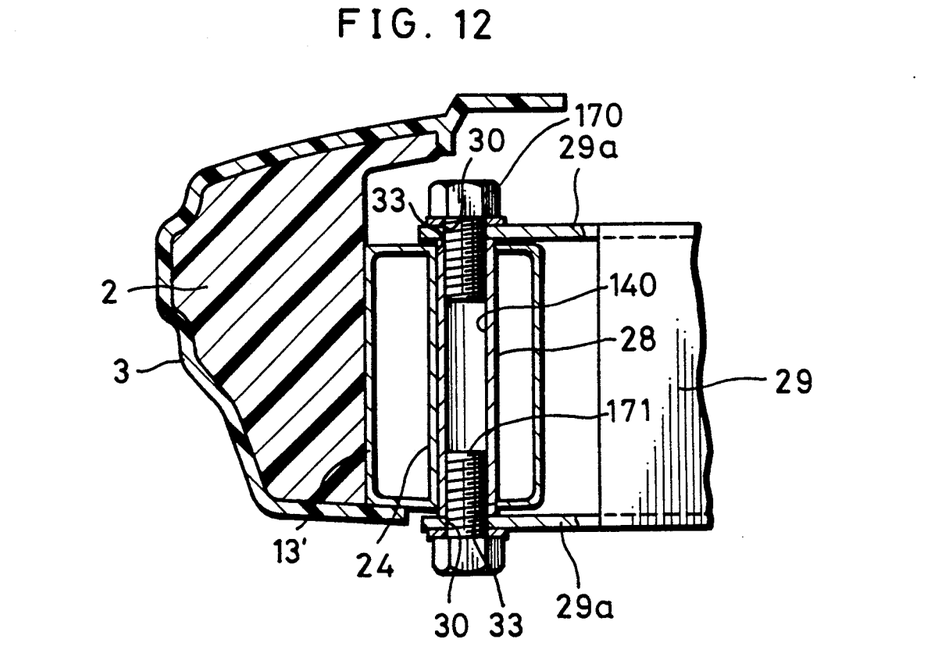
FIGS. 12 and 13 are sectional views corresponding to FIG. 10 and showing eighth and ninth embodiments of the invention.

In another embodiment illustrated in FIG. 12, the through-hole of the bumper stay 28 is made a threaded through-hole 140, bolts 170, 171 are screwed into the through-hole 140 from above and below, respectively, and the bolts 170, 171 are tightened. In still another embodiment shown in FIG. 13, the bumper stay 28 comprises coaxially disposed nuts 130, 131. The bolts 170, 171 are screwed into the nuts 130, 131 from above and below, respectively, and the bolts 170, 171 are tightened.

Figure 13:
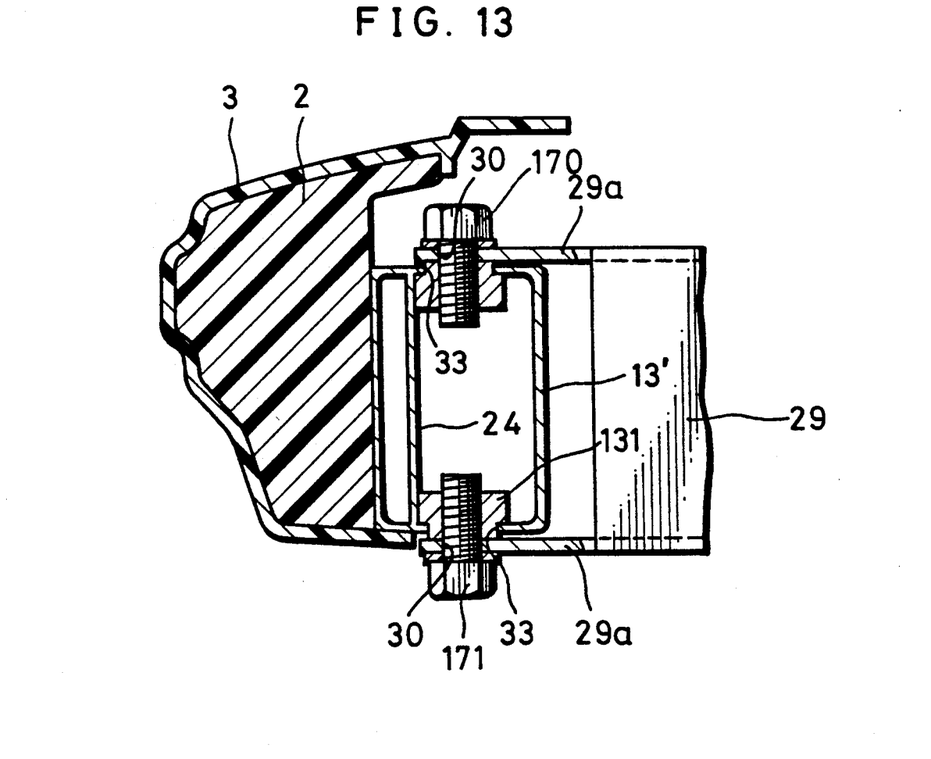

Since the bumper stay 28 is disposed near the neutral axis of the bumper reinforcement 13', stretching of the bumper reinforcement 13' is facilitated when a load acts upon the bumper reinforcement 13' and the latter is flexurally deformed owing to impact caused by a collision or the like. A compressive load of the kind which hinders flexural deformation of the bumper reinforcement 13' can be reduced. As a result, compressive stress at the portions where the bumper reinforcement 13' is fixed to the bumper stay 28 and near the center of the load surface of the bumper reinforcement 13' can be reduced, thereby preventing local deformation. In addition, since the bumper stay 28 is turnably connected to the side member 29, flexural deformation of the bumper reinforcement 13' can be facilitated by this turning motion, and a turning moment which hinders flexural deformation of the bumper reinforcement 13' can also be reduced. This makes it possible to prevent local deformation, caused by a bending moment, at the portion where the bumper reinforcement 13' is fixed to the bumper stay 28. Furthermore, since the flexural deformation of the bumper reinforcement 13' can be increased, the energy absorbing capability of the bumper reinforcement 13' is enhanced, thereby reducing the effects of a collision upon the vehicle body.

As many apparently widely different embodiments of the present invention can be made without departing from the spirit and scope thereof, it is to be understood that the invention is not limited to the specific embodiments thereof except as defined in the appended claims.

What is claimed is:

1. A bumper assembly for an automotive vehicle, comprising:
   a pair of side members constituting part of an automotive vehicle body;
   a bumper reinforcement supported on said side members and extending transversely of the vehicle body, said bumper reinforcement having a front surface; and
   an energy absorber arranged on the front surface of said bumper reinforcement;
   said bumper reinforcement comprising a one-piece hollow member of uniform rectangular cross section throughout the length thereof and having upper and lower walls, front and rear walls joining with said upper and lower walls, and an intermediate wall disposed between said front and rear walls to join with and connect said upper and lower walls, said intermediate wall extending in parallel relation to said front and rear walls for the full length of said one-piece member.

2. The bumper assembly according to claim 1, wherein said intermediate wall is situated closer to said rear wall than said front wall.

3. The bumper assembly according to claim 1, wherein said intermediate wall is situated closer to said front wall than said rear wall.

4. The bumper assembly according to claim 1, wherein said bumper reinforcement comprises extrusion-molded aluminum alloy.

5. The bumper assembly according to claim 4, wherein said bumper reinforcement has a front-to-back dimension less than a top-to-bottom dimension.

* * * * *